US 9,334,774 B2

(12) United States Patent
Tan et al.

(10) Patent No.: US 9,334,774 B2
(45) Date of Patent: May 10, 2016

(54) CONTROL SYSTEM AND METHOD FOR PREVENTING HYDROCARBON SLIP DURING PARTICULATE MATTER FILTER REGENERATION

(75) Inventors: Julian C. Tan, Canton, MI (US); John Zeilstra, Chicago, IL (US); Christoph Thoele, Holdorf (DE); Gustavo Tepedino, Ann Arbor, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 266 days.

(21) Appl. No.: 12/773,414

(22) Filed: May 4, 2010

(65) Prior Publication Data

US 2011/0271656 A1    Nov. 10, 2011

(51) Int. Cl.
| | |
|---|---|
| *F01N 3/20* | (2006.01) |
| *F01N 9/00* | (2006.01) |
| *F01N 3/025* | (2006.01) |
| *F01N 3/10* | (2006.01) |
| *F01N 13/00* | (2010.01) |
| *F01N 3/035* | (2006.01) |

(52) U.S. Cl.
CPC .............. *F01N 3/0253* (2013.01); *F01N 3/103* (2013.01); *F01N 3/2033* (2013.01); *F01N 9/002* (2013.01); *F01N 13/009* (2014.06); *F01N 3/035* (2013.01); *F01N 3/2066* (2013.01); *F01N 2430/085* (2013.01); *F01N 2560/026* (2013.01); *F01N 2560/06* (2013.01); *F01N 2560/07* (2013.01); *F01N 2560/14* (2013.01); *F01N 2610/03* (2013.01); *F01N 2900/0412* (2013.01); *F01N 2900/0416* (2013.01); *F01N 2900/1404* (2013.01); *Y02T 10/26* (2013.01); *Y02T 10/47* (2013.01)

(58) Field of Classification Search
CPC ....... F01N 3/0253; F01N 3/10; F01N 3/2033; F01N 2430/08; F01N 2560/07; F01N 2610/03; F01N 2900/0416; F01N 2900/1404; F01N 13/009; F01N 9/002; F01N 2560/026; F01N 2900/0412; F01N 3/035; F01N 3/2066; Y02T 10/26; Y02T 10/47
USPC ................................... 60/285, 286, 295, 301
See application file for complete search history.

(56) References Cited

U.S. PATENT DOCUMENTS

| | | | | |
|---|---|---|---|---|
| 7,013,638 | B2 * | 3/2006 | Hiranuma et al. | 60/286 |
| 7,412,822 | B2 * | 8/2008 | Zhan et al. | 60/295 |
| 2001/0036428 | A1 * | 11/2001 | Tamura et al. | 422/186.04 |
| 2006/0053785 | A1 * | 3/2006 | Mori | 60/520 |
| 2007/0068148 | A1 * | 3/2007 | Kurata et al. | 60/297 |
| 2008/0000219 | A1 * | 1/2008 | Ratcliff et al. | 60/274 |

(Continued)

FOREIGN PATENT DOCUMENTS

| | | |
|---|---|---|
| CN | 1940258 | 4/2007 |
| CN | 101424204 | 5/2009 |

(Continued)

*Primary Examiner* — Kenneth Bomberg
*Assistant Examiner* — Brandon Lee

(57) ABSTRACT

An engine control system includes an injection determination module and an injection regulation module. The injection determination module determines a desired rate of hydrocarbon (HC) injection into exhaust gas produced by an engine for regeneration of a particulate matter (PM) filter. The injection regulation module increases a rate of HC injection from a first rate to the desired rate during a predetermined period before regeneration of the PM filter, wherein the predetermined period is based on a difference between a predetermined temperature and a temperature at an outlet of an oxidation catalyst (OC).

21 Claims, 4 Drawing Sheets

(56) References Cited

U.S. PATENT DOCUMENTS

2009/0107118 A1* 4/2009 Ruona .............................. 60/286
2010/0319323 A1* 12/2010 Yan ................................. 60/286

FOREIGN PATENT DOCUMENTS

DE 10325083 1/2004
WO WO 2009100412 A1 * 8/2009

* cited by examiner

CONTROL SYSTEM AND METHOD FOR PREVENTING HYDROCARBON SLIP DURING PARTICULATE MATTER FILTER REGENERATION

FIELD

The present disclosure relates to internal combustion engines, and more particularly to a control system and method for exhaust gas temperature (EGT) to prevent hydrocarbon (HC) slip during particulate matter (PM) filter regeneration.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Internal combustion engines combine air and fuel to create an air/fuel (A/F) mixture that is combusted within a plurality of cylinders. The combustion of the A/F mixture drives pistons which rotatably turn a crankshaft generating drive torque. Specifically, air may be drawn into the cylinders and compressed using the pistons. Fuel may then be combined with (i.e., injected into) the compressed air causing the pressurized A/F mixture to combust (e.g., a compression ignition, or CI engine). For example, CI engines include diesel engines.

Alternatively, the air may be mixed with fuel to create the A/F mixture prior to compression. The A/F mixture may then be compressed until the A/F mixture reaches a critical pressure and/or temperature and automatically ignites (e.g., a homogeneous charge compression ignition, or HCCI engine). HCCI engines, however, may also "assist" ignition of the A/F mixture using spark from spark plugs. In other words, HCCI engines may ignite the A/F mixture using spark assist depending on engine operating conditions. For example, HCCI engines may use spark assist at low engine loads.

Exhaust gas produced during combustion may be expelled from the cylinders into an exhaust manifold. The exhaust gas may include carbon monoxide (CO) and hydrocarbons (HC). The exhaust gas may also include nitrogen oxides (NOx) due to the higher combustion temperatures of CI engines and HCCI engines compared to spark ignition (SI) engines. An exhaust treatment system may treat the exhaust gas to remove CO, HC, and/or NOx. For example, the exhaust treatment system may include, but is not limited to, at least one of an oxidation catalyst (OC), a particulate matter (PM) filter, a selective catalytic reduction (SCR) system, NOx absorbers/adsorbers, and catalytic converters.

SUMMARY

An engine control system includes an injection determination module and an injection regulation module. The injection determination module determines a desired rate of hydrocarbon (HC) injection into exhaust gas produced by an engine for regeneration of a particulate matter (PM) filter. The injection regulation module increases a rate of HC injection from a first rate to the desired rate during a predetermined period before regeneration of the PM filter, wherein the predetermined period is based on a difference between a predetermined temperature and a temperature at an outlet of an oxidation catalyst (OC).

A method includes determining a desired rate of hydrocarbon (HC) injection into exhaust gas produced by an engine for regeneration of a particulate matter (PM) filter, and increasing a rate of HC injection from a first rate to the desired rate during a predetermined period before regeneration of the PM filter, wherein the predetermined period is based on a difference between a predetermined temperature and a temperature at an outlet of an oxidation catalyst (OC).

In still other features, the systems and methods described above are implemented by a computer program executed by one or more processors. The computer program can reside on a tangible computer readable medium such as but not limited to memory, nonvolatile data storage, and/or other suitable tangible storage mediums.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
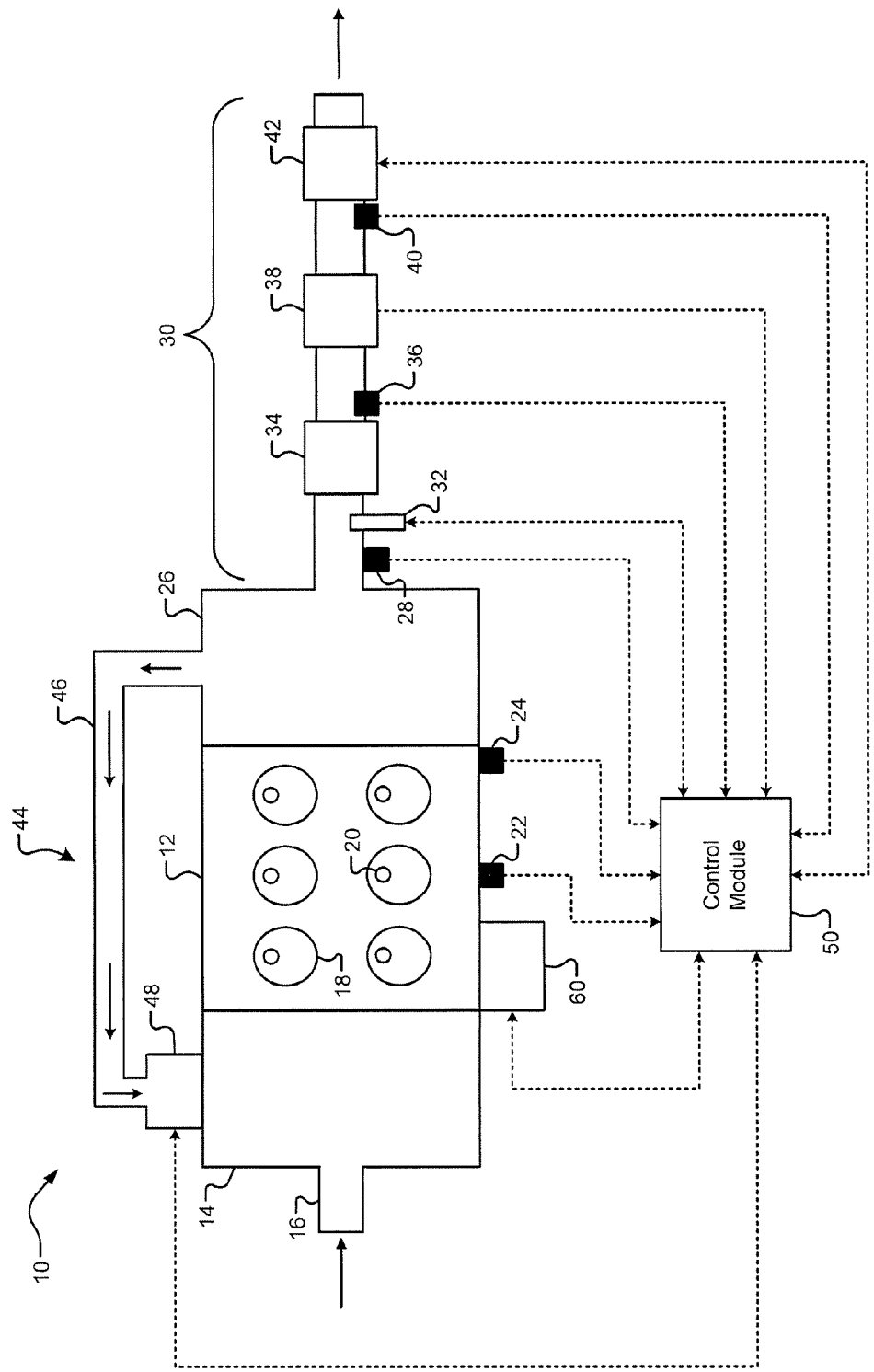
FIG. 1 is a functional block diagram of an exemplary engine system according to the present disclosure.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, and/or a combinational logic circuit.

Compression ignition (CI) (e.g., diesel) and homogeneous charge compression ignition (HCCI) engines may include similar exhaust treatment systems. More specifically, exhaust treatment systems for CI and HCCI engines may include an oxidation catalyst (OC) located before (i.e., upstream from) a selective catalytic reduction (SCR) catalyst and a particulate matter (PM) filter. The OC oxidizes carbon monoxide (CO) and hydrocarbons (HC) to form carbon dioxide ($CO_2$) and water ($H_2O$). The SCR catalyst (in conjunction with a dosing agent, such as urea) removes nitrogen oxides (NOx) from the exhaust gas.

The PM filter, on the other hand, removes PM from the exhaust gas. The PM filter may remove PM from the exhaust gas until the PM filter is saturated. In other words, the saturation condition may correspond to when the PM filter is full of PM (e.g., soot), after which a regeneration cycle may begin. The regeneration cycle may introduce HC into the exhaust gas. The HC in the exhaust gas may be catalyzed by the OC in an exothermic reaction that generates heat and increases exhaust gas temperature (EGT). The increased EGT at the outlet of the OC (i.e., at the inlet of the PM) may burn and/or breakdown the PM trapped in the PM filter, thus "regenerating" the PM filter.

Exhaust treatment systems, therefore, may further include one or more HC injectors that inject HC (e.g., fuel) upstream from an OC in an exhaust stream. Alternatively, exhaust treatment systems may perform post-combustion fuel injection to introduce HC into the exhaust gas. Conventional control systems control injection of HC into the exhaust stream during PM filter regeneration based on exhaust flow. The exhaust gas, however, may include HC due to incomplete catalyzation by the OC.

In other words, the OC may not entirely catalyze the injected HC due to insufficient temperature of the OC. The injected HC that passes the OC without being catalyzed may be referred to as "HC slip." HC slip may poison (i.e., damage) the SCR catalyst, and may further render the SCR catalyst inoperable. Moreover, HC slip may trigger unintentional and/or uncontrolled regeneration cycles of the PM filter. In other words, HC slip may result in increased emissions and/or damage to various components of the exhaust treatment system (e.g., the SCR catalyst, the PM filter, etc.).

Accordingly, a system and method are presented that regulate HC injection to prevent HC slip. The system and method may increase a rate of HC injection based on an outlet temperature of the OC until a desired rate of HC injection is reached. The system and method may determine the desired rate of HC injection based on exhaust gas flow and a speed of the vehicle. For example, the system and method may increase the rate of HC injection according to a time-based ramp function based on the outlet temperature of the OC. Alternatively, the system and method may determine a desired amount of HC injection and control HC injection based on the desired amount of HC injection. In other words, the system and method may gradually increase HC injection based on OC outlet temperature to prevent HO slip, thus decreasing emissions and/or protecting the SCR catalyst and the PM filter.

Referring now to FIG. 1, an engine system 10 includes a CI engine 12. For example only, the engine 12 may be a diesel engine or an HCCI engine. The engine 12 combusts an air/fuel (A/F) mixture to produce drive torque. Air is drawn into an intake manifold 14 through an inlet 16. A throttle (not shown) may be included to regulate air flow into the intake manifold 14. Air from the intake manifold 14 is distributed into a plurality of cylinders 18. While six cylinders 18 are shown, it can be appreciated that the engine 12 may include other numbers of cylinders.

Fuel injectors 20 correspond to the cylinders 18. The fuel injectors 20 may inject fuel directly into the cylinders 18 (i.e., direct fuel injection). Alternatively, however, the fuel injectors 20 may inject fuel via intake ports of the cylinders 18 (i.e., port fuel injection). A piston (not shown) compresses and combusts the A/F mixture within the cylinder 18. The piston drives an engine crankshaft (not shown) during a power stroke to produce drive torque. In one embodiment, the cylinders 18 may include spark plugs (not shown) (e.g., for spark assist in an HCCI engine). The fuel injectors 20 may also inject fuel into the cylinders 18 after combustion of the A/F mixture (i.e., post-combustion injection) to introduce hydrocarbons (HC) into exhaust gas.

The crankshaft (not shown) rotates at engine speed or a rate that is proportional to engine speed. A crankshaft speed (CS) sensor 22 measures a rotational speed of the crankshaft. For example only, the CS sensor 22 may be a variable reluctance sensor. Drive torque from the engine crankshaft may be transferred to a driveline of a vehicle (e.g., wheels) via a transmission (not shown). A transmission output shaft speed (TOSS) sensor 24 measures a rotational speed of the output shaft of the transmission 24. In other words, the measurement from the TOSS sensor 24 may indicate vehicle speed. Both engine speed and vehicle speed, however, may be measured or calculated using other suitable sensors and/or methods.

The exhaust gas resulting from the combustion within the cylinders 18 is expelled into an exhaust manifold 26. An exhaust mass air flow (EMAF) sensor 28 generates an EMAF signal that indicates a rate of air flowing through the EMAF sensor 28. For example, the EMAF signal may be indicate or be used to determine exhaust flow through an exhaust treatment system 30. Thus, the EMAF sensor 28 may be located between the exhaust manifold 26 and the exhaust treatment system 30.

The exhaust treatment system 30 may treat the exhaust gas. The exhaust treatment system 30 may include an HC injector 32, an OC 34, an SCR catalyst 38, and a PM filter 42. The exhaust treatment system 30 may also include temperature sensors 36, 40 located at an outlet of the OC 34 and an inlet of the PM filter 42, respectively. Temperature sensor 36 may measure temperature at the outlet of the OC 34, hereinafter referred to as $T_1$. Temperature sensor 40 may measure temperature at the inlet of the PM filter 42, hereinafter referred to as $T_2$. While only two temperature sensors 36, 40 are shown, other numbers of temperature sensors may be implemented. Additionally or alternatively, temperatures at various locations in the exhaust treatment system (including $T_1$ and $T_2$) may be modeled based on engine operating parameters.

The HC injector 32 selectively injects hydrocarbons into an exhaust stream. As previously described, however, the fuel injectors 20 may perform post-combustion injection to introduce HC into the exhaust gas. The OC 34 oxidizes CO and HC in the exhaust gas. The SCR catalyst 38 removes NOx from the exhaust gas. The PM filter 42 removes PM from the exhaust gas. The exhaust treatment system 30 may further include one or more NOx sensors (not shown) that measure exhaust gas NOx concentration.

A control module 50 communicates with and/or controls various components of the engine system 10. The control module 50 may receive signals from the CS sensor 22, the TOSS sensor 24, the EMAF sensor 28, temperature sensor 36, and temperature sensor 40. The control module 50 may communicate with the PM filter 42 to determine when a regeneration cycle is required. Alternatively, the control module 50 may determine that regeneration of the PM filter 42 is required based on other parameters and/or modeling. For example, the control module 50 may determine that regeneration of the PM filter 42 is required when exhaust flow is less than a predetermined exhaust flow threshold (i.e., the PM filter 42 is restricted by PM).

The control module 50 may also control a throttle (not shown), the fuel injectors 20, the HC injector 32, and an exhaust gas recirculation (EGR) valve 48 (discussed in more detail below). More specifically, the control module 50 may actuate the fuel injectors 20 (i.e., post-combustion injection) or the HC injector 32 to control EGT and thus may control regeneration of the PM filter 42. The control module 50 may also implement the system and method of the present disclosure to regulate HC injection and prevent HC slip.

The engine system 10 may further include an EGR system 44. The EGR system 44 includes the EGR valve 48 and an EGR line 46. The EGR system 44 may introduce a portion of exhaust gas from the exhaust manifold 26 into the intake manifold 14. The EGR valve 48 may be mounted on the intake manifold 14. The EGR line 46 may extend from the exhaust manifold 26 to the EGR valve 48, providing communication between the exhaust manifold 26 and the EGR valve 48. As previously described, the control module 50 may actuate the EGR valve 48 to increase or decrease an amount of exhaust gas introduced into the intake manifold 14.

The engine 12 may also include a turbocharger 60. The turbocharger 60 may be driven by the exhaust gas received through a turbine inlet. For example only, the turbocharger 60 may include a variable nozzle turbine. The turbocharger 60 increases airflow into the intake manifold 14 to cause an increase in intake MAP (i.e., manifold absolute pressure, or boost pressure). The control module 50 may actuate the turbocharger 60 to selectively restrict the flow of the exhaust gas, thereby controlling the boost pressure.

Figure 2:
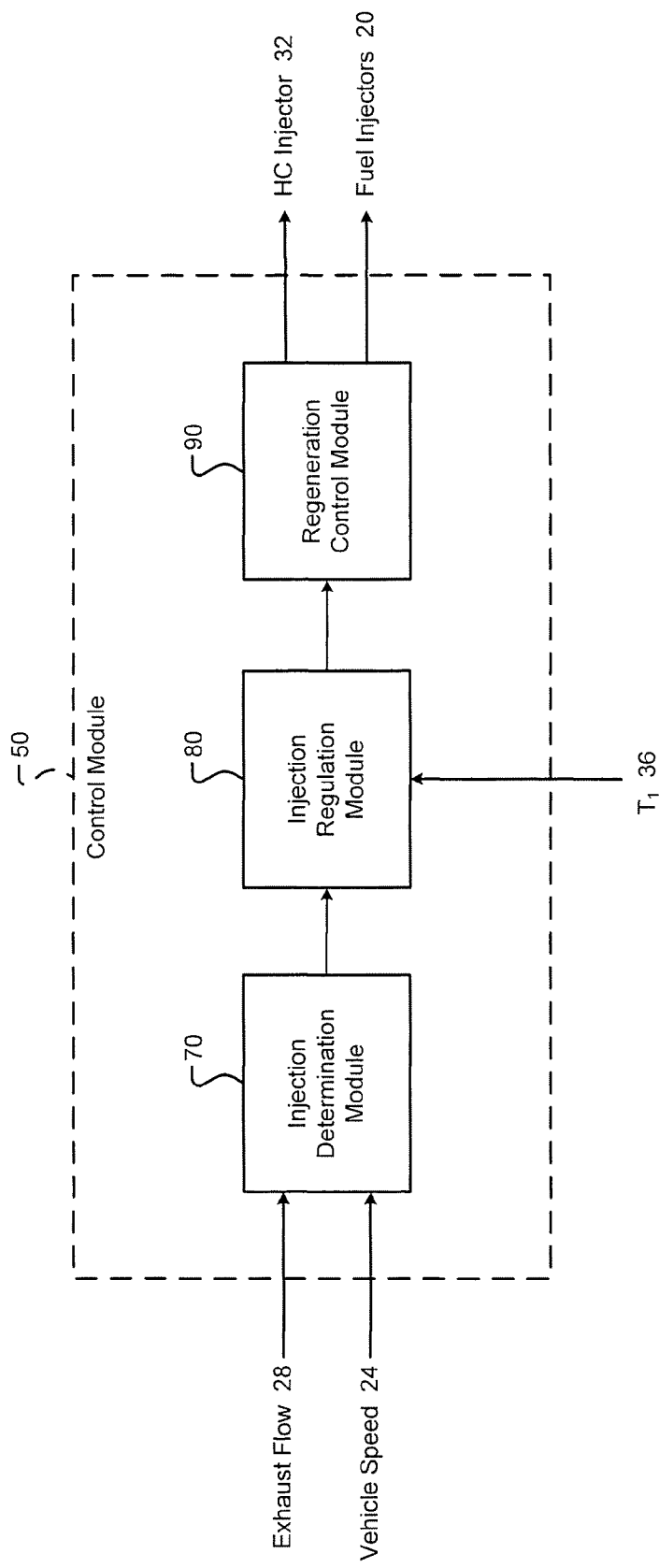
FIG. 2 is a functional block diagram of an exemplary control module according to the present disclosure.

Referring now to FIG. 2, the control module 50 is shown in more detail. The control module 50 may include an injection determination module 70, an injection regulation module 80, and a regeneration control module 90. The injection determination module 70 receives signals from the EMAF sensor 28 and the TOSS sensor 24 indicating exhaust flow and vehicle speed, respectively. The injection determination module 70 may determine a desired rate of HC injection required for regeneration of the PM filter 42 based on the exhaust flow and the vehicle speed. Alternatively, the injection determination module 70 may determine a desired amount of HC injection for regeneration of the PM filter 42 based on the exhaust flow and the vehicle speed.

The injection regulation module 80 receives the desired rate of HC injection from the injection determination module 70. The injection regulation module 80 may also receive a signal from temperature sensor 36 indicating the temperature $T_1$ at the outlet of the OC 34. The injection regulation module 80 generate a regulated rate of HC injection based on the desired rate of HC injection and the outlet temperature $T_1$. Rather, the injection regulation module 80 may rate limit the desired rate of HC injection based on the measured temperature $T_1$. In other words, the OC 34 may catalyze merely a portion of the injected HC at a given outlet temperature, and thus the rate of HC injection may be regulated (i.e., rate limited) to prevent HC slip.

For example, the injection regulation module 80 may include a lookup table that includes a plurality of values relating to various outlet temperatures of the OC 34. The plurality of values may be used to rate limit the HC injection. For example only, the plurality of values may include HC injection rates that may be subtracted from the desired rate of HC injection. Alternatively, however, the plurality of values may regulate (i.e., rate limit) the desired HC rate according to other suitable methods. The injection regulation module 80 may then output a regulated rate of HC injection.

The regeneration control module 90 is used for controlling injection of HC. Rather, the regeneration control module 90 receives the regulated rate of HC injection from the injection regulation module 80 and the regeneration control module 90 controls injection of HC into the exhaust gas. More specifically, the regeneration control module 90 may actuate the fuel injectors 20 (e.g., during a post-combustion period) and/or the HC injector 32 based on the regulated rate of HC injection. For example, the regeneration control module 90 may generate control signals for the fuel injectors 20 and/or the HC injector 32. In other words, the control signal may be used to control a rate of HC injected into the exhaust gas during regeneration of the PM filter 42 while preventing HC slip.

Figure 3:
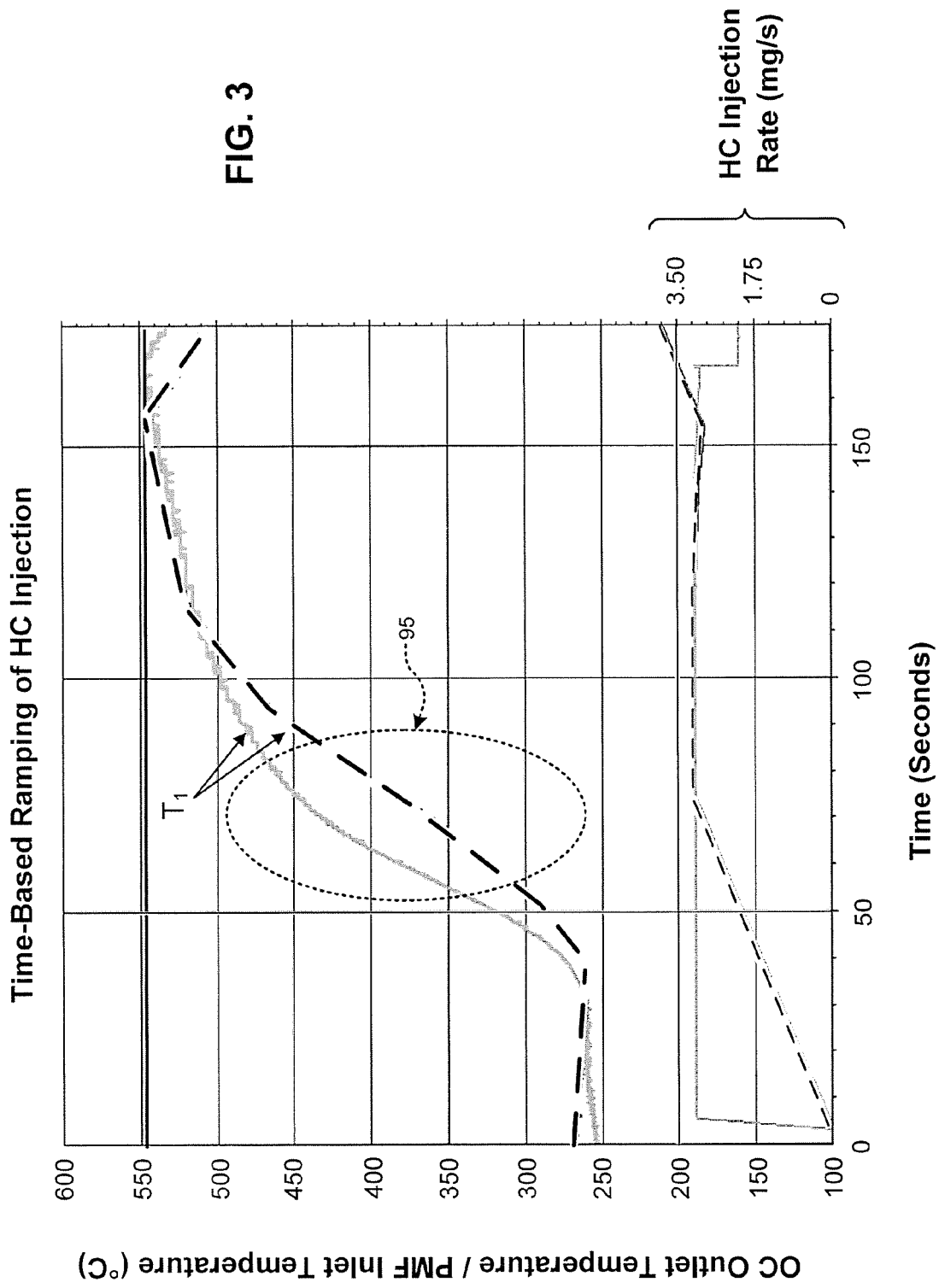
FIG. 3 is a graph illustrating time-based ramping of hydrocarbon (HC) injection based on outlet temperature of an oxidation catalyst (OC) according to the present disclosure.

Referring now to FIG. 3, a graph illustrating time-based ramping of HC injection is shown. The temperature $T_1$ is shown for both a desired rate of HC injection (i.e., a constant rate) and a time-based ramping to the desired rate of HC injection. More specifically, the desired rate of HC injection is 3.0 milligrams per second (mg/s) and the time-based ramp function increases HC injection from a first rate of HC injection (e.g., zero mg/s) to the desired rate of HC injection (3.0 mg/s) at a rate (e.g., slope) of 0.1 mg/s. For example, the slope of the time-based ramp function may be based on the temperature at the outlet of the OC. As shown in region 95, rate limiting the HC injection based on OC outlet temperature decreases HC slip.

Figure 4:
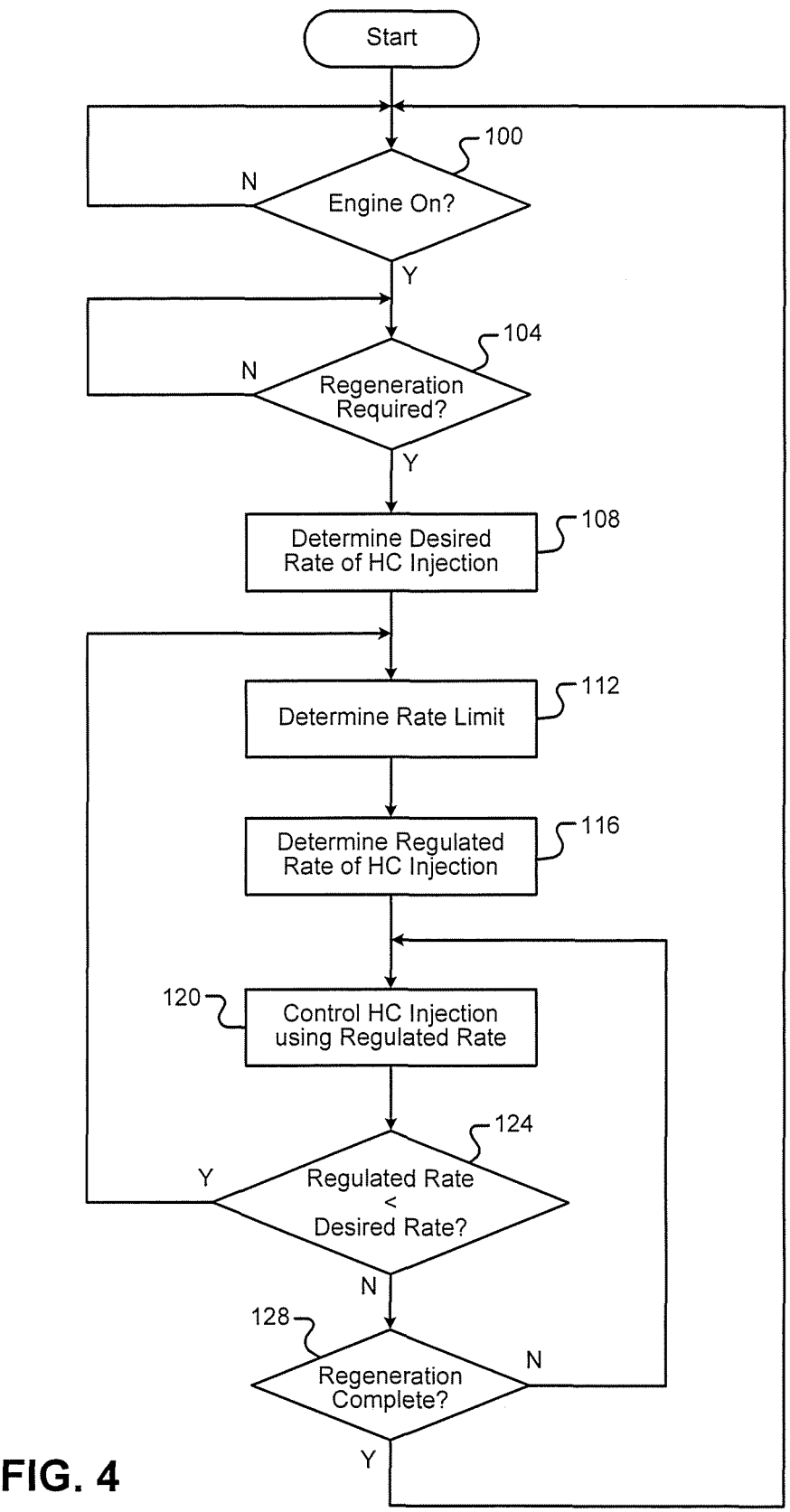
FIG. 4 is a flow diagram of an exemplary method for controlling exhaust gas temperature (EGT) to prevent HC slip during particulate matter (PM) filter regeneration according to the present disclosure.

Referring now to FIG. 4, a method for regulating HC injection to prevent HC slip begins at 100. At 100, the control module 50 determines whether the engine 12 is on. If true, control may proceed to 104. If false, control may return to 100. At 104, the control module 50 may determine whether regeneration of the PM filter 42 is required. If true, control may proceed to 108. If false, control may return to 100.

At 108, the control module 50 may determine the desired rate of HC injection. At 112, the control module 50 may determine a rate limit for the HO injection based on the measured outlet temperature $T_1$ of the OC 34. At 116, the control module 50 may determine a regulated rate of HC injection. In other words, the control module 50 may rate limit the desired rate of HC injection according to the determined rate limit.

At 120, the control module 50 may control HC injection according to the regulated rate of HC injection. At 124, the control module 50 may determine whether the regulated rate of HC injection has reached the desired rate of HC injection. If true, control may proceed 128. If false, control may return to 112. At 128, the control module 50 may determine whether regeneration of the PM filter 42 is complete. If true, control may return to 100. If false, control may return to 120.

The broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. An exhaust treatment system, comprising:
   a hydrocarbon (HC) injector,
   a first electronic circuit configured to determine a desired rate of HC injection into exhaust gas produced by an engine for regeneration of a particulate matter (PM) filter; and
   a second electronic circuit configured to:
      control the HC injector to inject HC into exhaust gas produced by the engine;
      select a target slope of a time-based ramp function based on a temperature at an outlet of an oxidation catalyst (OC) when regeneration of the PM filter is desired; and
      increase a rate of HC injection from a first rate to the desired rate using the time-based ramp function to regenerate the PM filter while preventing HC slip across the OC, wherein the rate at which the HC injection rate is increased is equal to the target slope of the time-based ramp function.

2. The exhaust treatment system of claim 1, wherein:
the second electronic circuit is configured to adjust the rate at which the HC injection rate is increased based on a difference between the temperature at the outlet of the OC and a predetermined temperature; and
the predetermined temperature includes a temperature for the OC to fully catalyze HC injected into the exhaust gas at the desired rate of HC injection.

3. The exhaust treatment system of claim 1, wherein the first rate of HC injection is zero.

4. The exhaust treatment system of claim 1, wherein the second electronic circuit is configured to increase the rate of HC injection based on a measured temperature at the outlet of the OC.

5. The exhaust treatment system of claim 1, wherein the second electronic circuit is configured to determine the desired rate of HC injection based on exhaust gas flow and vehicle speed.

6. The exhaust treatment system of claim 1, further comprising: a third electronic circuit configured to control injection of HC into the exhaust gas based on the rate of HC injection.

7. The exhaust treatment system of claim 6, wherein the third electronic circuit is configured to control injection of HC into the exhaust gas by actuating an HC injector, and wherein the HC injector is located upstream from the OC.

8. The exhaust treatment system of claim 6, wherein the third electronic circuit is configured to control injection of HC into the exhaust gas by actuating fuel injectors during a post-combustion period, and wherein the fuel injectors correspond to cylinders in the engine.

9. The exhaust treatment system of claim 1, wherein the first and second electronic circuits include at least one of an Application Specific Integrated Circuit (ASIC), a processor and memory including one or more programs, and a combinational logic circuit.

10. The exhaust treatment system of claim 3, wherein the second electronic circuit is configured to increase the rate of HC injection from the first rate to the desired rate using a single rate.

11. The exhaust treatment system of claim 1, wherein the HC injector injects HC into at least one of:
a cylinder of the engine;
an intake port of the cylinder; and
an exhaust system that receives exhaust gas from the cylinder.

12. The exhaust treatment system of claim 1, wherein the temperature at the outlet of the OC used to select the target slope of the time-based ramp function is measured.

13. A method, comprising:
determining a desired rate of hydrocarbon (HC) injection into exhaust gas produced by an engine for regeneration of a particulate matter (PM) filter;
injecting HC into exhaust gas produced by the engine using an HC injector;
selecting a target slope of a time-based ramp function based on a temperature at an outlet of an oxidation catalyst (OC) when regeneration of the PM filter is desired;
increasing a rate of HC injection from a first rate to the desired rate using the time-based ramp function to regenerate the PM filter while preventing HC slip across the OC, wherein the rate at which the HC injection rate is increased is equal to the target slope of the time-based ramp function; and
injecting HC into exhaust gas at the desired rate using the HC injector.

14. The method of claim 13, further comprising adjusting the rate at which the HC injection rate is increased based on a difference between the temperature at the outlet of the OC and a predetermined temperature, wherein the predetermined temperature includes a temperature for the OC to fully catalyze HC injected into the exhaust gas at the desired rate of HC injection.

15. The method of claim 13, wherein the first rate of HC injection is zero.

16. The method of claim 13, further comprising:
increasing the rate of HC injection based on a measured temperature at the outlet of the OC.

17. The method of claim 13, further comprising:
determining the desired rate of HC injection based on exhaust gas flow and vehicle speed.

18. The method of claim 13, wherein the injecting of HC into the exhaust gas includes actuating the HC injector, wherein the HC injector is located upstream from the OC.

19. The method of claim 13, wherein the injecting of HC into the exhaust gas includes actuating fuel injectors during a post-combustion period, wherein the fuel injectors correspond to cylinders in the engine.

20. The method of claim 15, further comprising increasing the rate of HC injection from the first rate to the desired rate using a single rate.

21. The method of claim 13, wherein the temperature at the outlet of the OC used to select the target slope of the time-based ramp function is measured.

\* \* \* \* \*